US010865613B2

(12) United States Patent
Hughes et al.

(10) Patent No.: US 10,865,613 B2
(45) Date of Patent: Dec. 15, 2020

(54) DOWNHOLE TOOL ASSEMBLY

(71) Applicant: INNOVEX DOWNHOLE SOLUTIONS, INC., Houston, TX (US)

(72) Inventors: Steven Hughes, The Woodlands, TX (US); Leonard Neatherlin, The Woodlands, TX (US)

(73) Assignee: INNOVEX DOWNHOLE SOLUTIONS, INC., Houston, TX (US)

( * ) Notice: Subject to any disclaimer, the term of this patent is extended or adjusted under 35 U.S.C. 154(b) by 0 days.

(21) Appl. No.: 16/360,582

(22) Filed: Mar. 21, 2019

(65) Prior Publication Data

US 2019/0292863 A1 Sep. 26, 2019

Related U.S. Application Data

(60) Provisional application No. 62/646,215, filed on Mar. 21, 2018.

(51) Int. Cl.
| | |
|---|---|
| *E21B 17/046* | (2006.01) |
| *E21B 23/00* | (2006.01) |
| *E21B 23/01* | (2006.01) |
| *E21B 23/06* | (2006.01) |
| *F16L 37/248* | (2006.01) |
| *E21B 31/00* | (2006.01) |

(52) U.S. Cl.
CPC .......... *E21B 23/006* (2013.01); *E21B 17/046* (2013.01); *E21B 23/004* (2013.01); *E21B 23/01* (2013.01); *E21B 23/06* (2013.01); *E21B 31/00* (2013.01); *F16L 37/248* (2013.01)

(58) Field of Classification Search
CPC .... E21B 17/021; E21B 17/046; E21B 23/004; E21B 23/006; E21B 23/06; E21B 31/00
See application file for complete search history.

(56) References Cited

U.S. PATENT DOCUMENTS 3,420,305 A * 1/1969 Alexander .............. E21B 33/12
166/114
2017/0211346 A1 * 7/2017 Bullock ................ E21B 17/046

* cited by examiner

*Primary Examiner* — Tara Schimpf
(74) *Attorney, Agent, or Firm* — MH2 Technology Law Group LLP

(57) ABSTRACT

A method of latching a production tubing to a packer in a wellbore, an assembly, and a connection, of which the method includes lowering the production tubing into the wellbore, the production tubing being coupled to a first body comprising a slot and a blocking member. The production tubing is lowered until a lug on a second body contacts the blocking member, the second body being coupled to a packer. The method includes raising the production tubing relative to the packer which causes the lug to move out of contact with the blocking member, lowering the production tubing into the wellbore again until the lug contacts and removes the blocking member, and rotating the production tubing such that the lug advances into the slot, so as to latch the production tubing and the packer together.

20 Claims, 3 Drawing Sheets

DOWNHOLE TOOL ASSEMBLY

CROSS-REFERENCE TO RELATED APPLICATIONS

This application claims priority to U.S. Patent Application having Ser. No. 62/646,215, which was filed on Mar. 21, 2018, and is incorporated herein by reference in its entirety.

BACKGROUND

There are several steps that occur when a production tubing is connected (or latched) to a packer in a conventional connection operation. In the first step, the production tubing is lowered into the wellbore until an overshot on the production tubing engages a stinger on the packer. The engagement of the overshot and the stinger typically includes moving a lug on the overshot through a J-slot on the stinger by rotating production tubing relative to the packer in a first direction. In the second step, the overshot on the production tubing is disengaged from the stinger on the packer by rotating production tubing relative to the packer in a second opposite direction and then the production tubing pulled up relative to the packer to space out the production tubing. In the third step, the production tubing is lowered into the wellbore until the overshot on the production tubing is connected to the stinger on the packer by moving the lug through the J-slot as the production tubing is rotated relative to the packer.

SUMMARY

A method of latching a production tubing to a packer in a wellbore is disclosed. The method includes lowering the production tubing into the wellbore, the production tubing being coupled to a first body comprising a slot and a blocking member. The production tubing is lowered until a lug on a second body contacts the blocking member, the second body being coupled to a packer. The method includes raising the production tubing relative to the packer which causes the lug to move out of contact with the blocking member, lowering the production tubing into the wellbore again until the lug contacts and removes the blocking member, and rotating the production tubing such that the lug advances into the slot, so as to latch the production tubing and the packer together.

An assembly for connecting a production tubing to a packer is disclosed. The assembly includes a first body having a blocking member disposed in a slot, and a second body having a lug configured to engage the blocking member in the slot. The first body is configured to be coupled to one of a packer and a production tubing, and wherein the second body is configured to be coupled to the other one of the packer and the production tubing, such that the first body and the second body are together configured to provide a connection between the production tubing and the packer.

A connection for connecting together a packer and a production tubing is disclosed. The connection includes a first body having a helical slot and a blocking member that obstructs an entrance to the slot, and a second body sized to be received into the first body and comprising a lug configured to be received into the slot. The blocking member is configured to prevent the lug from entering the slot. The blocking member is configured to be removed by a predetermined force applied by the lug onto the blocking member, and the first body is configured to receive the lug into the slot by rotating the first body relative to the second body once the blocking member is removed.

It is to be understood that both the foregoing general description and the following detailed description are exemplary and explanatory only and are not restrictive of the present teachings, as claimed.

BRIEF DESCRIPTION OF THE DRAWINGS

The accompanying figures, which are incorporated in and constitute a part of this specification, illustrate embodiments of the present teachings and together with the description, serve to explain the principles of the present teachings. In the figures.

DETAILED DESCRIPTION

Figure 1:
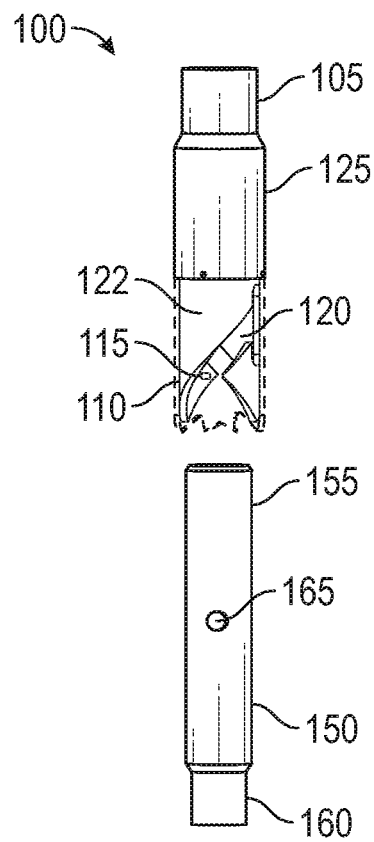
FIG. 1 illustrates a view of a downhole tool assembly, according to an embodiment.

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawing that forms a part thereof, and in which is shown by way of illustration a specific embodiment in which the present teachings may be practiced. The following description is, therefore, merely illustrative of an example.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

FIG. 1 illustrates a view of a downhole tool assembly 100, according to an embodiment. As shown, the assembly 100 is in a run-in position. The assembly 100 includes a first body 125 and a second body 150. The first body 125 may be an overshot and the second body 150 may be a stinger (or a seal nipple); thus, the assembly 100 may provide a connection between a production tubing and a packer. For example, the first body 125 may be configured to be connected to a production tubing that extends uphole, and the second body 150 may be configured to be connected to a packer that extend downhole. In other embodiments, the first body 125 may form a part of the production tubing, and the second body 150 may form a part of the packer. Either such case (connected to or integral with) is within the scope of the term "coupled to" as it pertains to the first body 125 and the production tubing, and the second body 150 and the packer.

The first body 125 may include one or more generally cylindrical members. For example, the illustrated first body 125 includes an upper portion 105 and a lower portion 110. The upper portion 105 may include a connection member, such as threads, that may be configured to be connected to a production tubing. The lower portion 110 includes at least one blocking member 115.

In an embodiment, the lower portion 110 may include an outer surface 117 and an inner surface 122. The inner and outer surfaces 117, 122 may be inner and outer diameter surfaces of the same wall that forms the cylindrical body of the lower portion 110, or may be surfaces of separate walls that are, e.g., concentric to one another.

At least one slot 120 may extend outward into the cylindrical body of the lower portion 110. The slot 120 may be defined in the inner surface 122, extending radially outward. The slot 120 may extend at least partially helically and, in some embodiments, may be a J-slot.

As shown, a blocking member 115 may extend inward at least partially through the slot 120. The blocking member 115 is configured to be removed after a certain load is reached. The blocking member 115 may be a post, which may be cylindrical or any other shape. Further, the blocking member 115 may be integrally formed from the lower portion 110. In other embodiments, the blocking member 115 may be a shear pin, a no-go or another removable member, e.g., received into a hole formed in the lower portion 110. In other embodiments, the blocking member 115 may be a door or latch that extends across the slot 120 and prevents entrance of the lug 165 into the slot 120 or otherwise impedes the movement of the lug 165 therein.

The second body 150 is a generally cylindrical member. The second body 150 includes an upper portion 155 and a lower portion 160. The upper portion 155 may be sized to be received at least partially into the lower portion 110 of the first body 125. The lower portion 160 of the second body 150 may include a connection member, such as threads, that may be configured to be connected to a packer (not shown). The second body 150 further includes a lug 165 between the upper portion 155 and the lower portion 160. As will be described herein, the lug 165 in the second body 150 is configured to engage with the slot 120 and the blocking member 115 of the first body 125.

Figure 2:
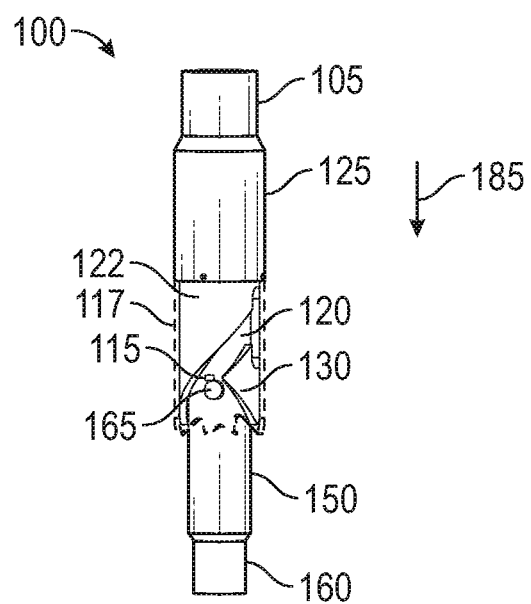
FIG. 2 illustrates a view of the downhole tool assembly in a tag position, according to an embodiment.

FIG. 2 illustrates a view of the downhole tool assembly 100 in a tag position, according to an embodiment. As the production tubing and (or including) the first body 125 are lowered into the wellbore in the direction shown by arrow 185, the first body 125 approaches the second body 150. At one point during the movement of the production tubing, the first body 125 engages the second body 150 such that the lower portion 110 of the first body 125 slides over the upper portion 155 of the second body 150. Thereafter, the lug 165 of the second body 150 enters into a lower opening 130 of the slot 120 of the first body 125 and subsequently contacts the blocking member 115. In some embodiments, the blocking member 115 may prevent the lug 165 from entering the slot 120.

At the point where the lug 165 contacts the blocking member 115, the first body 125 has "tagged" the second body 150, and the movement in the direction of arrow 185 is stopped. The contact between the blocking member 115 and the lug 165 may be insufficient to yield or otherwise remove the blocking member 115, and thus the blocking member 115 may prevent the lug 165 from advancing into the slot 120. As such, it will be appreciated that the number, size, and/or type of blocking member 115 may be selected based upon the load (or force) incident thereon during the contact between the lug 165 and the blocking member 115 during the tagging operation. When the tagging operation is complete and the lug 165 is engaged with the blocking member 115, an upper portion of the production tubing that extends from the first body 125 and, e.g., from wellbore may be measured and/or marked.

Figure 3:
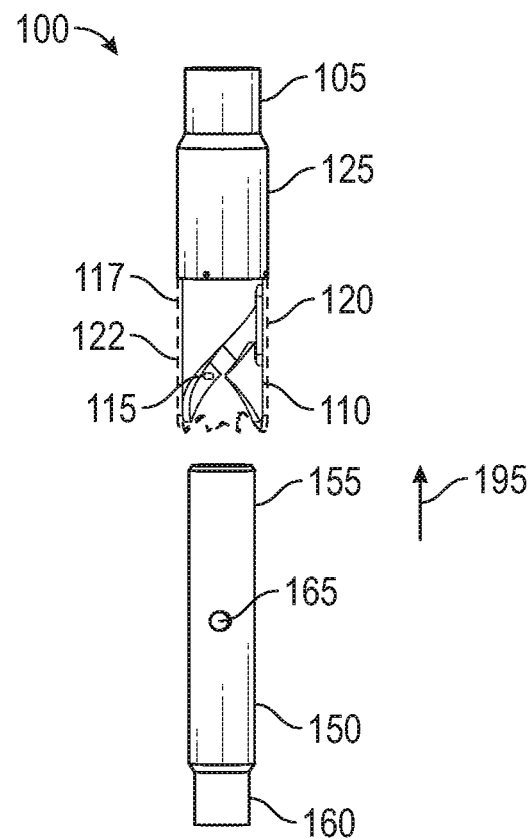
FIG. 3 illustrates a view of the downhole tool assembly in a spaced apart configuration, according to an embodiment.

FIG. 3 illustrates a view of the downhole tool assembly 100 in a spaced apart configuration, according to an embodiment. After the first body 125 has tagged the second body 150, the production tubing and the first body 125 are moved in the direction shown by arrow 195 (e.g., uphole) with respect to the second body 150, which advances the upper portion of the production tubing out of the wellbore. The production tubing and the first body 125 may not be rotated relative to the packer and the second body 150 in order to separate the first body 125 from the second body 150, but rather moved axially, because the blocking member 115 blocked the engagement of the lug 165 and the slot 120, which would otherwise interfere with such axial movement. After the production tubing and the first body 125 have moved a predetermined or otherwise suitable distance, the movement is stopped. Next, the upper portion of the production tubing proximate the mark (or otherwise at a measured location) is cut.

Figure 4:
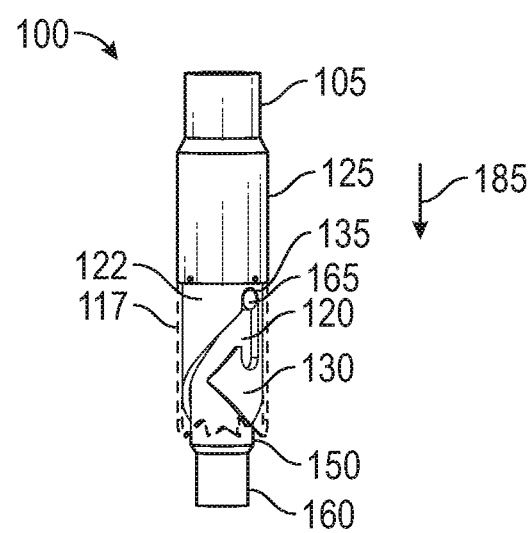
FIG. 4 illustrates a view of the downhole tool assembly in a latch configuration, according to an embodiment.

FIG. 4 illustrates a view of the downhole tool assembly 100 in a latch configuration, according to an embodiment. After a portion of the production tubing has been cut/removed, the production tubing and the first body 125 are lowered into the wellbore in the direction shown by arrow 185. As a result, the first body 125 engages the second body 150 such that the lower portion 110 of the first body 125 slides over the upper portion 155 of the second body 150. Thereafter, the lug 165 of the second body 150 enters into the opening 130 of the slot 120 of the first body 125 and subsequently contacts and removes the blocking member 115. At that point, the lug 165 travels along the slot 120 of the first body 125 to a latch position 135. The first body 125 and the second body 150 are latched together, which results in the production tubing (coupled to the first body 125) being connected to the packer (coupled to the second body 150). In one embodiment, the first body 125 is configured to capture the portion of the blocking member 115 removed by the lug 165.

As described herein (FIGS. 1-4), the first body 125 may be coupled to the production tubing and the second body 150 may be coupled to the packer. In another embodiment, the first body 125 may be coupled to the packer and the second body 150 may be coupled to the production tubing.

Figure 5:
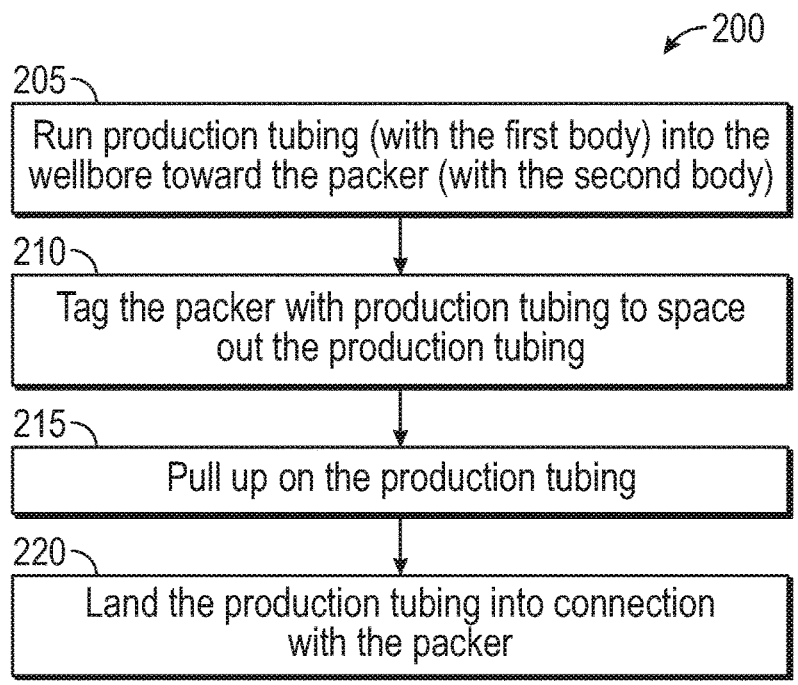
FIG. 5 illustrates a flowchart of a method of latching a production tubing to a packer, according to an embodiment.
Figure 6:
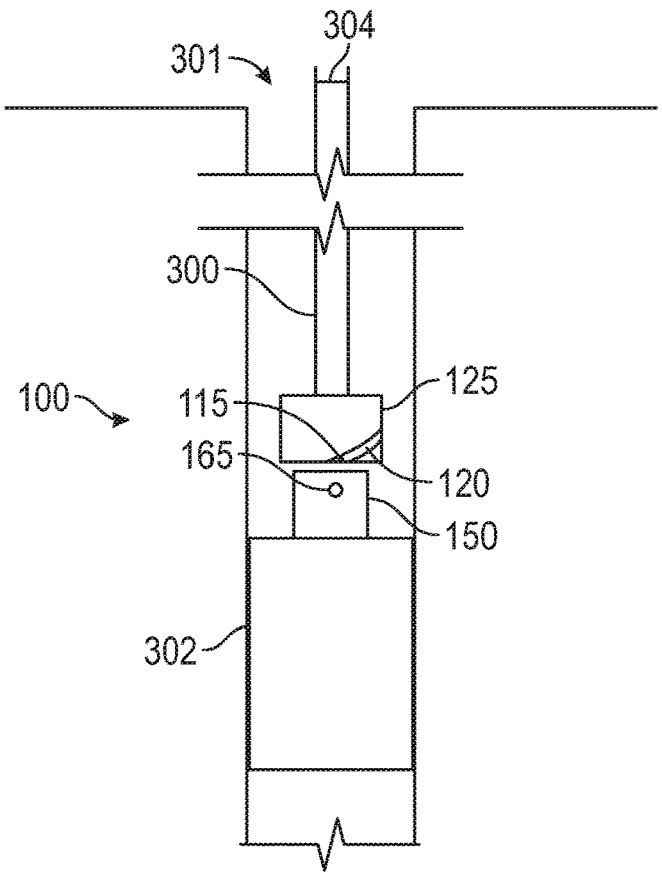
FIG. 6 illustrates a simplified, schematic view of the downhole tool assembly in operation, according to an embodiment.

FIG. 5 illustrates a flowchart of a method 200 of latching a production tubing to a packer in a wellbore, according to an embodiment. For the sake of convenience, reference is made to the embodiment of the downhole tool assembly 100 shown in and described above, but it will be appreciated that embodiments of the method 200 may apply to the other described embodiments, or even other types of structures. FIG. 6 illustrates a schematic view of the assembly 100, which will further serve to illustrate aspects of the method 200, according to an embodiment.

Referring to both FIGS. 5 and 6, the method 200 may include running a production tubing 300 with the first body 125 of the downhole tool assembly 100 into a wellbore 301 toward a packer 302 that is coupled to the second body 150 of the downhole tool assembly 100, as at 205. The assembly 100 may thus serve as a connection between the packer 302 and the production tubing 300, once the operations described herein are complete. In some embodiments, the first body 125 may be an overshot and the second body 150 may be a stinger (or a seal nipple).

The method 200 may include tagging the packer 302 with the production tubing 300 to space out the production tubing 300, as at 210. With additional reference to FIG. 1, at one point during the tagging operation, the first body 125 engages the second body 150 such that the lower portion 110 of the first body 125 slides over the upper portion 155 of the second body 150. Thereafter, the lug 165 of the second body 150 enters into the lower opening 130 of the slot 120 of the first body 125 and contacts the blocking member 115. In other embodiments, the blocking member 115 may be considered to prevent the lug 165 from fully entering the slot 120. The blocking member 115 is not removed during the tagging operation. In some embodiments, an upper portion of the production tubing 300 that extends from the wellbore is marked, producing a mark or cut line 304. The cut line 304 may be located where the production tubing 300 is level with the top of the wellbore 301, or another piece of equipment, or any other datum line.

The method 200 may include pulling up on production tubing 300 to a spaced apart configuration, as at 215. This is specifically shown in FIG. 6. After the production tubing and the first body 125 have moved a predetermined distance, the movement is stopped. Next, the upper portion of the production tubing proximate the mark 304 is cut.

The method 200 may include landing the production tubing 300 on the packer 302, as at 220. After a portion of the production tubing 300 has been removed (e.g., the part above the cut line 304), the production tubing 300 and the first body 125 are lowered into the wellbore 301 to allow the first body 125 to engage the second body 150. The lug 165 of the second body 150 enters into the opening 130 of the slot 120 of the first body 125 and contacts and removes the blocking member 115. At that point, the lug 165 travels along the slot 120 of the first body 125 to a latch position 135. The production tubing 300 and the first body 125 may then be rotated relative to the second body 150 and the packer 302, such that the first body 125 and the second body 150 are latched together, which results in the production tubing 300 being connected to the packer 302.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of latching a production tubing to a packer in a wellbore, the method comprising:
lowering the production tubing into the wellbore, the production tubing being coupled to a first body comprising a slot and a blocking member, wherein the production tubing is lowered until a lug on a second body contacts the blocking member, the second body being coupled to a packer;
raising the production tubing relative to the packer which causes the lug to move out of contact with the blocking member;
lowering the production tubing into the wellbore again until the lug contacts and removes the blocking member; and
rotating the production tubing such that the lug advances into the slot, so as to latch the production tubing and the packer together.

2. The method of claim 1, wherein the blocking member is configured to block movement of the lug in the slot until the production tubing is to be latched to the packer.

3. The method of claim 1, wherein raising the production tubing relative to the packer comprises raising the production tubing without rotating the production tubing.

4. The method of claim 3, wherein the slot in the production tubing is at least partially helical.

5. The method of claim 4, wherein the slot is a J-slot.

6. The method of claim 4, wherein the blocking member is located at an entrance to the slot.

7. The method of claim 1, further comprising cutting off a portion of the production tubing after the production tubing is raised relative to the packer.

8. The method of claim 7, wherein cutting off the portion comprises marking a cut line before raising the production tubing, and cutting off the portion after raising the production tubing.

9. An assembly for connecting a production tubing to a packer, the assembly comprising:
a first body having a blocking member disposed in a slot; and
a second body having a lug configured to engage the blocking member in the slot,
wherein the first body is configured to be coupled to one of a packer and a production tubing, and wherein the second body is configured to be coupled to the other one of the packer and the production tubing, such that the first body and the second body are together configured to provide a connection between the production tubing and the packer, and wherein the blocking member is configured to block the lug from moving in the slot until the lug applies a predetermined force onto the blocking member.

10. The assembly of claim 9, wherein the blocking member is configured to block movement of the lug in the slot until the production tubing is to be latched to the packer.

11. The assembly of claim 9, wherein the blocking member is positioned such that, when the lug is in contact with the blocking member, and the second body is removable from within the first body without rotating the first body.

12. The assembly of claim 11, wherein the blocking member is configured to be removed in response to a predetermined load applied by the lug onto the blocking member, and wherein the lug of the second body is configured to be advanced into the slot by rotating the first body relative to the second body after shearing off the blocking member.

13. The assembly of claim 9, wherein the slot comprises a J-slot.

14. The assembly of claim 9, wherein the first body is configured to be coupled to the production tubing, and wherein the second body is configured to be coupled to the packer.

15. An assembly for connecting a production tubing to a packer, the assembly comprising:
a first body having a blocking member disposed in a slot; and
a second body having a lug configured to engage the blocking member in the slot,
wherein the first body is configured to be coupled to one of a packer and a production tubing, and wherein the second body is configured to be coupled to the other one of the packer and the production tubing, such that the first body and the second body are together configured to provide a connection between the production tubing and the packer, wherein the first body comprises a lower portion have an inner surface and an outer surface, and wherein a slot is defined in the inner surface, and the blocking member extends inward into the slot.

16. The assembly of claim 15, wherein the second body is configured to be received at least partially into the lower portion.

17. An assembly for connecting a production tubing to a packer, the assembly comprising:
a first body having a blocking member disposed in a slot; and
a second body having a lug configured to engage the blocking member in the slot, wherein the first body is configured to be coupled to one of a packer and a production tubing, and wherein the second body is configured to be coupled to the other one of the packer and the production tubing, such that the first body and the second body are together configured to provide a connection between the production tubing and the packer, and wherein the blocking member comprises a post that blocks an opening of the slot.

18. A connection for connecting together a packer and a production tubing, the connection comprising:
a first body having a helical slot and a blocking member that obstructs an entrance to the slot; and
a second body sized to be received into the first body and comprising a lug configured to be received into the slot,
wherein the blocking member is configured to prevent the lug from entering the slot,
wherein the blocking member is configured to be removed by a predetermined force applied by the lug onto the blocking member, and
wherein the first body is configured to receive the lug into the slot by rotating the first body relative to the second body once the blocking member is removed.

19. The connection of claim 18, wherein the blocking member comprises a post that extends radially into the slot, proximal to or at an entrance of the slot.

20. The connection of claim 19, wherein the first body comprises an inner surface and an outer surface that surrounds the inner surface, wherein the slot is defined in the inner surface, and wherein the post extends inward at least partially through the slot.

* * * * *